US012754454B2

(12) United States Patent
Lee et al.

(10) Patent No.: US 12,754,454 B2
(45) Date of Patent: Oct. 6, 2026

(54) SINGLE PHOTON SOURCE DEVICE AND METHOD OF MANUFACTURING THE SAME

(71) Applicant: Bright Quantum Inc., Daejeon (KR)

(72) Inventors: Donghan Lee, Daejeon (KR); Daehyun Ahn, Daejeon (KR); Yudong Jang, Daejeon (KR)

(73) Assignee: Bright Quantum Inc., Daejeon (KR)

(*) Notice: Subject to any disclaimer, the term of this patent is extended or adjusted under 35 U.S.C. 154(b) by 345 days.

(21) Appl. No.: 18/615,935

(22) Filed: Mar. 25, 2024

(65) Prior Publication Data

US 2024/0337895 A1 Oct. 10, 2024

(30) Foreign Application Priority Data

Apr. 5, 2023 (KR) ........................ 10-2023-0044820

(51) Int. Cl.
*G02F 1/35* (2006.01)

(52) U.S. Cl.
CPC .................................. *G02F 1/3503* (2021.01)

(58) Field of Classification Search
CPC ..... G02F 1/01791; H02B 10/70; B82Y 20/00; H10H 2020/855
See application file for complete search history.

(56) References Cited

U.S. PATENT DOCUMENTS 11,451,306 B2* 9/2022 Davanco ................ H04B 10/70
2007/0195307 A1* 8/2007 Schuster .............. G02B 13/143 359/717
2012/0056111 A1* 3/2012 Schroder ................ H04B 10/70 250/503.1
2024/0337895 A1* 10/2024 Lee ....................... G02F 1/3503
2026/0082742 A1* 3/2026 Lee ...................... H10H 20/856

FOREIGN PATENT DOCUMENTS

| | | | |
|---|---|---|---|
| JP | 2007-242881 A | 9/2007 | |
| JP | 2012-256883 A | 12/2012 | |
| JP | 6031978 B2 | 11/2016 | |
| KR | 10-2016-0091146 A | 8/2016 | |
| KR | 20160091146 A * | 8/2016 | H10H 20/855 |
| KR | 10-2022-0086464 A | 6/2022 | |

OTHER PUBLICATIONS

D. H. Ahn, Y. D. Jang, J. S. Baek, S. I. Park, J. D. Song, D. Lee; A broadband high-brightness quantum-dot double solid immersion lens single photon source. APL Photonics Mar. 1, 2023; 8 (3): 036102. (Year: 2023).*
Ahn et al., "A broad-band planar-microcavity quantum-dot single-photon source with a solid immersion lens", Applied Physics Letter, Apr. 26, 2021, vol. 118.
Office Action dated Jun. 18, 2025 received in Korean Application No. 10-2023-0044820.
Notice of Allowance in Korean Patent Application No. 10-2023-044820 dated Nov. 11, 2025.

* cited by examiner

*Primary Examiner* — Rhonda S Peace
(74) *Attorney, Agent, or Firm* — Knobbe, Martens, Olson & Bear, LLP

(57) ABSTRACT

A single photon source device is proposed. The device may include a reflection layer, an insulating layer disposed on the reflection layer, and a single emitter configured to emit a single photon. The device may also include a first solid immersion lens portion disposed on the insulating layer to surround the single emitter, and a second solid immersion lens portion disposed on the insulating layer to surround the first solid immersion lens portion.

20 Claims, 14 Drawing Sheets

SINGLE PHOTON SOURCE DEVICE AND METHOD OF MANUFACTURING THE SAME

CROSS-REFERENCE TO RELATED APPLICATION

This application is based on and claims priority from Korean Patent Application No. 10-2023-0044820 filed on Apr. 5, 2023, the disclosure of which is incorporated herein in its entirety by reference for all purposes.

TECHNICAL FIELD

The present disclosure relates to a single photon source device and a method of manufacturing the single photon source device.

BACKGROUND

In quantum information technology, qubits (quantum bits) are created by using single photons and used in application fields such as quantum cryptography communication and quantum computing.

SUMMARY

One aspect is a single photon source device that simultaneously satisfies a wide operating band and high light collection efficiency, and a method of manufacturing the single photon source device.

Another aspect is a single photon source device that is easy to manufacture and has a good yield and low manufacturing cost, and a method of manufacturing the single photon source device.

Another aspect is a single photon source device including: a reflection layer; an insulating layer disposed on the reflection layer; a single emitter configured to emit a single photon; a first solid immersion lens portion disposed on the insulating layer to surround the single emitter; and a second solid immersion lens portion disposed on the insulating layer to surround the first solid immersion lens portion.

Further, the first solid immersion lens portion may have a convex shape protruding from the insulating layer, and the second solid immersion lens portion may have a convex shape protruding from the insulating layer.

Further, the single emitter may be spaced apart from the insulating layer in a height direction of the single photon source device.

Further, the single emitter may be located within 200 nm from a virtual line in a radial direction perpendicular to the virtual line, the virtual line passing through a center of a cross section of the first solid immersion lens portion on the insulating layer and extending in the height direction of the single photon source device.

Further, a distance between the single emitter and the insulating layer may be a distance corresponding to an antinode of a distribution of the single photon emitted from the single emitter.

Further, a center of a cross section of the second solid immersion lens portion on the insulating layer may be located within 500 nm in the radial direction perpendicular to the virtual line from the virtual line.

Further, the first solid immersion lens portion may include a semiconductor.

Further, the first solid immersion lens portion may include one or more of gallium arsenide (GaAs), aluminum gallium arsenide (AlGaAs), gallium indium phosphide (GaInP), indium gallium arsenide (InGaAs), aluminum indium gallium arsenide (AlInGaAs), indium phosphide (InP), and indium gallium arsenide phosphide (InGaAsP).

Further, the second solid immersion lens portion may include one or more of a polymer and a dielectric.

Further, the polymer included in the second solid immersion lens portion may be a photoresist or an electron beam resist, and the dielectric included in the second solid immersion lens portion may include one or more of silicon nitride (SiN), silicon oxide ($SiO_2$), aluminum oxide ($Al_2O_3$), aluminum nitride (AlN), titanium oxide ($TiO_2$), hafnium oxide ($HfO_2$), magnesium oxide (MgO), and zirconium oxide (ZnO).

Further, a refractive index of the second solid immersion lens portion may be smaller than a refractive index of the first solid immersion lens portion.

Further, the refractive index of the first solid immersion lens portion may range from 1.8 to 4.0, and the refractive index of the second solid immersion lens portion may range from 1.2 to 2.5.

Further, the reflection layer may include one or more of gold (Au), silver (Ag), aluminum (Al), copper (Cu), and a distributed Bragg reflector (DBR).

Further, the insulating layer may be transparent at an emission wavelength of the single emitter.

Further, the insulating layer may include one or more of silicon nitride (SiN), silicon oxide ($SiO_2$), aluminum oxide ($Al_2O_3$), aluminum nitride (AlN), titanium oxide ($TiO_2$), hafnium oxide ($HfO_2$), magnesium oxide (MgO), and zirconium oxide (ZnO).

Further, the single emitter may be a quantum dot.

Further, the quantum dot may include a semiconductor.

Further, the quantum dot may include one or more of indium arsenide (InAs), indium gallium arsenide (InGaAs), aluminum gallium arsenide (AlGaAs), gallium arsenide (GaAs), and indium phosphide (InP).

Further, the single emitter may include one or more of a solid point defect and a single molecule.

Further, the solid point defect may include any one of a nitrogen-vacancy center and a silicon-vacancy center.

Further, the first solid immersion lens portion on the insulating layer may have a diameter of 400 nm to 2000 nm, and a height of 200 nm to 2000 nm, and the second solid immersion lens portion on the insulating layer may have a diameter of 1 μm to 10 μm and a height of 1 μm to 10 μm.

Further, the single photon source device may further include: a piezoelectric substrate disposed under the reflection layer, Another aspect is a method of manufacturing a single photon source device, including: forming a quantum dot containing epitaxial layer in which a quantum dot is located; processing the quantum dot containing epitaxial layer in which an insulating layer and a reflection layer are sequentially stacked on the quantum dot containing epitaxial layer; and except for a portion of the quantum dot containing epitaxial layer where the quantum dot is located, the insulating layer, and the reflection layer, the other portion of the quantum dot containing epitaxial layer is removed; forming a first solid immersion lens portion surrounding the quantum dot on the insulating layer using the portion of the quantum dot containing epitaxial layer where the quantum dot is located; and forming a second solid immersion lens portion surrounding the first solid immersion lens portion on the insulating layer.

According to the embodiments of the present disclosure, there is an effect that the single photon source device simultaneously satisfies a wide operating band and high light collection efficiency.

Further, according to the embodiments of the present disclosure, since a structure of the single photon source device is simple, there is effect that the single photon source device is easy to manufacture and has good yield and a low manufacturing cost.

DETAILED DESCRIPTION

Figure 1:
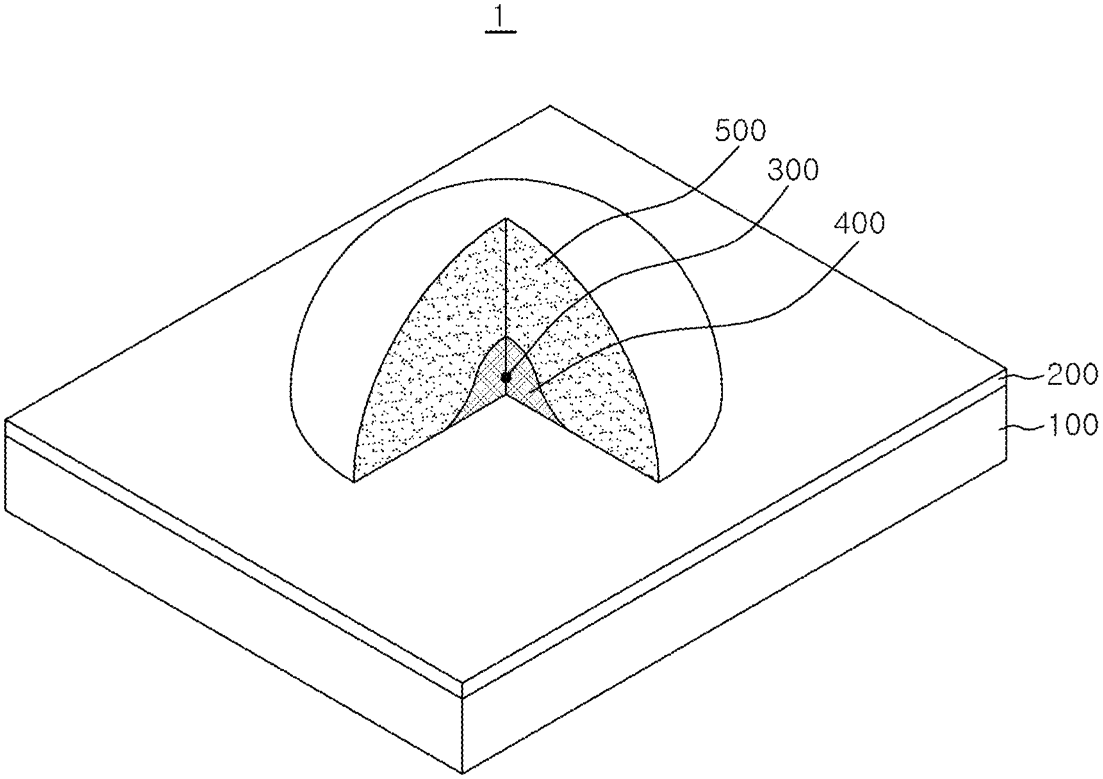
FIG. 1 is a partially cut-away perspective view showing a single photon source device according to a first embodiment of the present disclosure.

Single photon sources that emit single photons can be divided into a light source based on a single emitter and a light source based on a non-linear optical phenomenon, and the light sources based on a single emitter include atom/ion trap, solid-based defect/color center, two-dimensional material, a semiconductor quantum dot, and the like.

Among the light sources based on a single emitter, a semiconductor quantum dot single photon source is a single photon source that can generate single photons on demand and has a high purity of single photons. Semiconductor quantum dot is a three-dimensional isolated structures made of materials with different bandgap energies, with carriers energetically bound, is called an artificial atom because of formation of discontinuous energy levels, and is able to generate single photons through recombination of formed excitons.

Because the single photons emitted from the quantum dot are difficult to escape into the air, the semiconductor quantum dot single photon source requires a light collection structure that can increase light collection efficiency. High efficiency light collection structures that can be used in the semiconductor quantum dot single photon source known to date include a micro-pillar light collection structure, a bull's eye light collection structure, and the like. Since such light collection structures have a characteristic of a narrow operating band, it is very difficult to match an emission wavelength of the quantum dot with a resonance wavelength of the light collection structures, and it is also difficult to manufacture. Further, the light collection structure with a wide operating band is very difficult to manufacture or has low light collection efficiency.

Therefore, there is a need for a light collection structure for a single emitter single photon source that is relatively easy to manufacture while simultaneously satisfying a wide operating band and high light collection efficiency.

Hereinafter, specific embodiments for implementing a spirit of the present disclosure will be described in detail with reference to the drawings.

In describing the present disclosure, detailed descriptions of known configurations or functions may be omitted to clarify the present disclosure.

When an element is referred to as being 'connected' to, 'supported' by, 'accessed' to, 'supplied' to, 'transferred' to, or 'contacted' with another element, it should be understood that the element may be directly connected to, supported by, accessed to, supplied to, transferred to, or contacted with another element, but that other elements may exist in the middle.

The terms used in the present disclosure are only used for describing specific embodiments, and are not intended to limit the present disclosure. Singular expressions include plural expressions unless the context clearly indicates otherwise.

Further, in the present disclosure, it is to be noted that expressions, such as a radial direction, an upper side and a lower side, and a height direction are described based on the illustration of drawings, but may be modified if directions of corresponding objects are changed. For the same reasons, some components are exaggerated, omitted, or schematically illustrated in the accompanying drawings, and the size of each component does not fully reflect the actual size.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements, combinations, and/or groups thereof disclosed in the specification, and are not intended to preclude the possibility that one or more other certain features, areas, integers, steps, actions, elements, combinations, and/or groups thereof may exist or may be added.

Single Photon Source Device

Hereinafter, a specific configuration of a single photon source device 1 according to a first embodiment of the present disclosure will be described with reference to FIGS. 1 to 6.

Figure 2:
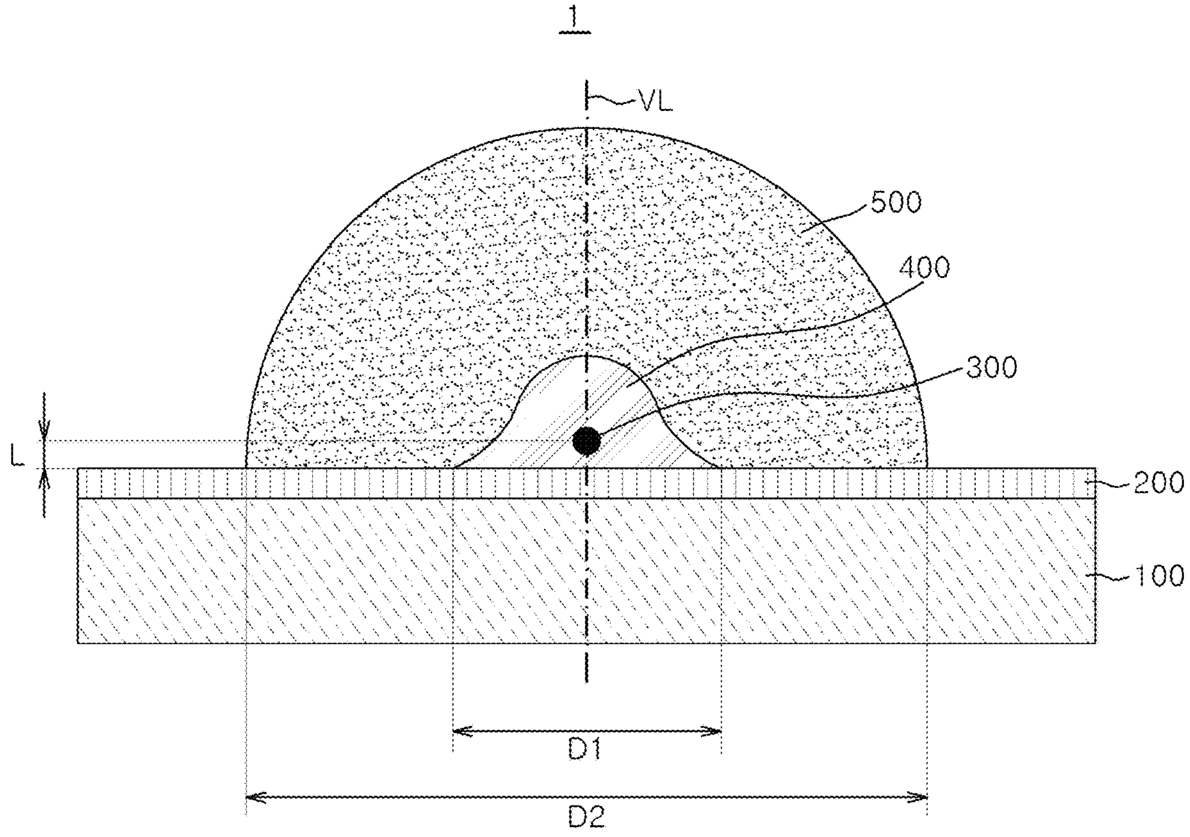
FIG. 2 is a cross-sectional view of a single photon source device according to a second embodiment of the present disclosure.
Figure 3:
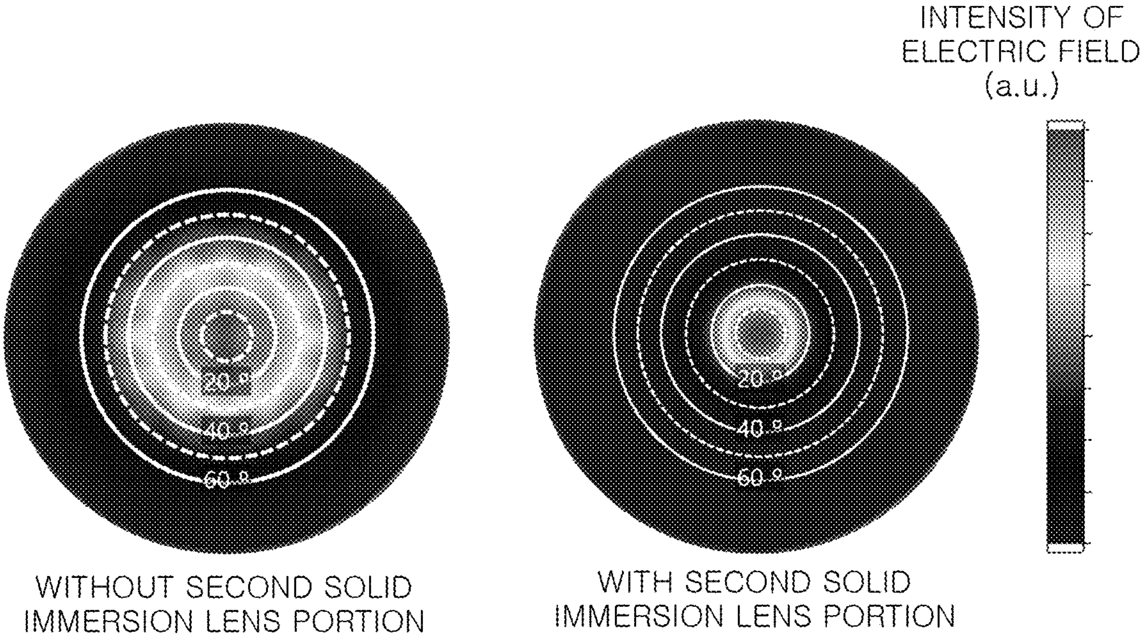
FIG. 3 is a diagram illustrating an intensity of an electric field according to an angle with respect to a center of the single photon source device that does not include a second solid immersion lens portion on the single photon source device when single photons are emitted from the single photon source device, and a diagram illustrating an intensity of an electric field according to an angle with respect to a center of the single photon source device that includes the second solid immersion lens portion on the single photon source device when single photons are emitted from the single photon source device.

The single photon source device 1 according to the first embodiment of the present disclosure emits a single photon (not shown). The single photon source device 1 allows single photons emitted from a single emitter 300 to be concentrated through a first solid immersion lens portion 400 and a second solid immersion lens portion 500. Due to the collection of the first solid immersion lens portion 400 and the second solid immersion lens portion 500, the single photons may be emitted from the single photon source device 1 in a height direction of the single photon source device 1 in a center portion of the single photon source device 1. Accordingly, the single photon source device 1 may have relatively high light collection efficiency. Further, the single photon source device 1 may have a wide operating band. In other words, the single photon source device 1 may have a relatively wide available wavelength band of the single photons emitted with a predetermined brightness or more. Since the single photon source device 1 has a simple structure, the single photon source device 1 is easy to manufacture and has a good yield and low manufacturing cost. Referring to FIGS. 1 and 2, the single photon source device 1 according to the first embodiment of the present disclosure may include a reflection layer 100, an insulating layer 200, a single emitter 300, a first solid immersion lens portion 400, and a second solid immersion lens portion 500.

The reflection layer 100 may reflect single photons that are emitted from the single emitter 300. The reflection layer 100 may be disposed beneath the insulating layer 200. Accordingly, the single emitter 300 spaced apart from the insulating layer 200 in a direction opposite to the reflection layer 100 may be located above the reflection layer 100. Further, in the single emitter 300, the single photons may be emitted around the single emitter 300 with the single emitter 300 as a center. In other words, the single photons may be emitted in a radial direction from the single emitter 300. In addition, among the single photons emitted from the single emitter 300, the single photons traveling under the single emitter 300 may be reflected by the reflection layer 100 and travel above the single emitter 300. In other words, the single photons emitted from the single emitter 300 and traveling under the single emitter 300 may be reflected by the reflection layer 100 and travel above the single emitter 300. Due to the reflection of the single photons in the reflection layer 100, most of the single photons emitted from the single emitter 300 can pass through the first solid immersion lens portion 400 and travel into the second solid immersion lens portion 500. The reflection layer 100 may include one or more of gold (Au), silver (Ag), aluminum (Al), copper (Cu), and a distributed Bragg reflector (DBR).

The insulating layer 200 may insulate the reflection layer 100. Further, the single emitter 300 is spaced apart from the insulating layer 200 and located inside the first solid immersion lens portion 400, thereby minimizing an influence of a resistance loss caused by the reflection layer 100 applied to the single emitter 300. This insulating layer 200 makes it possible for emission of the single photons from the single emitter 300 to be smoothly performed without being affected by the reflection layer 100. The insulating layer 200 may be disposed on the reflection layer 100. The insulating layer 200 may be transparent at an emission wavelength of the single emitter 300. Therefore, the insulating layer 200 allows the single photons emitted from the single emitter 300 and traveling under the single emitter 300 to pass through the insulating layer 200 and reach the reflection layer 100 while insulating the reflection layer 100. The insulating layer 200 may include one or more of silicon nitride (SiN), silicon oxide ($SiO_2$), aluminum oxide ($Al_2O_3$), aluminum nitride (AlN), titanium oxide ($TiO_2$), hafnium oxide ($HfO_2$), and zirconium oxide (ZnO).

The single emitter 300 may emit single photons. When the single emitter 300 is irradiated with light such as a laser having a predetermined wavelength, single photons determined by a structure of the single emitter 300 may be emitted from the single emitter 300.

The single emitter 300 may be a quantum dot. The quantum dot may include a semiconductor. When the quantum dot includes the semiconductor, the quantum dot may include one or more of indium arsenide (InAs), indium gallium arsenide (InGaAs), aluminum gallium arsenide (AlGaAs), gallium arsenide (GaAs), and indium phosphide (InP). The quantum dot may be formed by stacking various types of semiconductors, as will be described later.

The single emitter 300 may include one or more of a solid point defect and a single molecule. The solid point defect may include any one of a nitrogen-vacancy center and a silicon-vacancy center.

The single emitter 300 may be located inside the first solid immersion lens portion 400 so that the single emitter 300 is spaced apart from the insulating layer 200 in the height direction of the single photon source device 1. Further, the single emitter 300 may pass through a center of a cross section of the first solid immersion lens portion 400 above the insulating layer 200, and be located within 200 nm in a radial direction perpendicular to a virtual line VL extending in the height direction of the single photon source device 1 from the virtual line VL. When the single emitter 300 is located outside 200 nm in the radial direction perpendicular to the above-described virtual line VL from the virtual line VL, emission efficiency may decrease. Further, a distance L between the single emitter 300 and the insulating layer 200 may be a distance corresponding to an antinode of a distribution of single photons emitted from the single emitter 300. With this configuration, most of the single photons emitted from the single emitter 300 and the single photons emitted from the single emitter 300 and reflected by the reflection layer 100 may pass through the first solid immersion lens portion 400 to travel to the second solid immersion lens portion 500.

The first solid immersion lens portion 400 allows the single photons emitted from the single emitter 300 and the single photons emitted from the single emitter 300 and reflected by the reflection layer 100 to pass through the first solid immersion lens portion 400 to travel to the second solid immersion lens portion 500. Further, the first solid immersion lens portion 400 may form an optical mode so that the single photons emitted from the single emitter 300 and the single photons emitted from the single emitter 300 and reflected by the reflection layer 100 are primarily directed to around the height direction. Through the concentration of the single photons in the first solid immersion lens portion 400, the single photons emitted from the single emitter 300 and the single photons emitted from the single emitter 300 and reflected by the reflection layer 100 may be concentrated to some extent in the center portion of the first solid immersion lens portion 400 and travel to the second solid immersion lens portion 500. It can be seen from a drawing on the left side of FIG. 3 that the single photons emitted from the single emitter 300 and the single photons emitted from the single emitter 300 and reflected by the reflection layer 100 are concentrated to some extent to the center portion of the far-field radiation pattern.

There is a method in which the single emitter 300 is located in a single mode structure having a diameter as small as 200 nm so that only one light mode is allowed, and most of photons emitted from the single emitter 300 travel in only one direction in a single mode. However, it is difficult to dispose the single emitter 300 at a center of the single mode structure. Therefore, with the above-described method, it is difficult to cause most of the photons emitted from the single emitter 300 to travel in only one direction in the single mode. In other words, it is difficult for only single photons emitted in the height direction of the single photon source device 1 from the center portion of the single photon source device 1 to be emitted from the single emitter 300. However, in the present disclosure, even when single photons are emitted in a multi-mode from the single emitter 300, a mode of the single photons may mainly be a mode in which the single photons are emitted in the height direction of the single photon source device 1 from the center portion of the single photon source device 1 by the first solid immersion lens portion 400. In other words, in the present disclosure, the single emitter 300 needs not to be located at the center of the single mode structure having a diameter as small as 200 nm. Therefore, in the present disclosure, it can be easily realized that only the single photons emitted in the height direction of the single photon source device 1 from the center of the single photon source device 1 are emitted from the single emitter 300.

The first solid immersion lens portion 400 may be disposed on the insulating layer 200 to surround the single emitter 300. Further, the first solid immersion lens portion 400 may have a convex shape that protrudes from the insulating layer 200. The first solid immersion lens portion 400 may include a semiconductor. When the first solid immersion lens portion 400 includes the semiconductor, the first solid immersion lens portion 400 may include one or more of gallium arsenide (GaAs), aluminum gallium arsenide (AlGaAs), gallium indium phosphide (GaInP), indium gallium arsenide (InGaAs), aluminum indium gallium arsenide (AlInGaAs), indium phosphide (InP), and indium gallium arsenide phosphide (InGaAsP). In a case where the single emitter 300 is a quantum dot, the first solid immersion lens portion 400 may be formed by stacking several types of semiconductors to form a quantum dot and then wet-etching a layer where the quantum dot is located, as will be described later.

Figure 4:
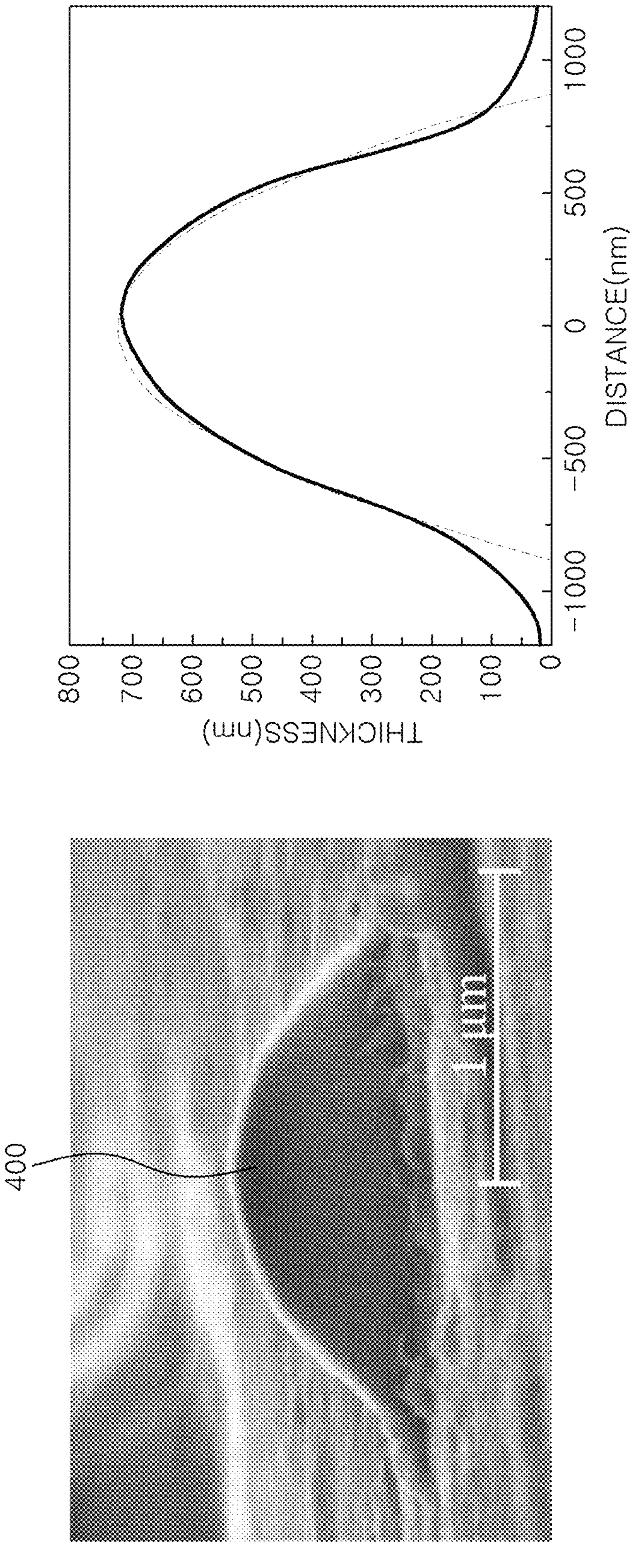
FIG. 4 shows an image obtained by imaging a first solid immersion lens portion of the single photon source device according to the first embodiment of the present disclosure using a scanning electron microscope (SEM), and a graph showing a thickness of the first solid immersion lens portion according to a distance from a center portion of the first solid immersion lens portion measured using an atomic force microscope (AFM).

Referring to FIGS. 2 and 4, the first solid immersion lens portion 400 on the insulating layer 200 may have a diameter D1 of about 400 nm to 2000 nm, and a thickness, that is, a height of about 200 nm to 2000 nm. When the diameter D1 of the first solid immersion lens portion 400 on the insulating layer 200 is smaller than 400 nm, manufacturing may be difficult by photolithography. Further, when the diameter D1 of the first solid immersion lens portion 400 on the insulating layer 200 is greater than 2000 nm, emission efficiency may decrease. Further, when the height of the first solid immersion lens portion 400 on the insulating layer 200 is smaller than 200 nm and greater than 2000 nm, the emission efficiency may decrease. A refractive index of the first solid immersion lens portion 400 may be 1.8 to 4.0. When the refractive index of the first solid immersion lens portion 400 is smaller than 1.8, the emission efficiency may decrease. Further, when the refractive index of the first solid immersion lens portion 400 is greater than 4.0, there may be sensitivity to a manufacturing error.

The second solid immersion lens portion 500 may allow the single photons passing through the first solid immersion lens portion 400 to be secondarily directed to the height direction and thus better-collected. Due to the secondary collection of the single photons passing through the second solid immersion lens portion 500, most of the single photons may be emitted in the height direction of the single photon source device 1 from the center of the single photon source device 1. In other words, the single photons may be emitted with directivity from the center of the single photon source device 1. It can be seen from a drawing on the right side of FIG. 3 that the single photons are emitted in the height direction of the single photon source device 1 from the second solid immersion lens portion 500 and thus are further concentrated to the center portion of the far-field radiation pattern.

The second solid immersion lens portion 500 may be disposed on the insulating layer 200 to surround the first solid immersion lens portion 400. Further, the second solid immersion lens portion 500 may have a convex shape that protrudes from the insulating layer 200. The second solid immersion lens portion 500 may include one or both of a polymer and a dielectric. The polymer included in the second solid immersion lens portion 500 may be photoresist. The polymer photoresist included in the second solid immersion lens portion 500 may include one or more of an AZ5200 series photoresist, a PMMA series electron beam resist, and an S1800 series photoresist. Meanwhile, the polymer included in the second solid immersion lens portion 500 may be an electron beam resist. The dielectric included in the second solid immersion lens portion 500 may include one or more of silicon nitride, silicon oxide, aluminum oxide, aluminum nitride, titanium oxide, hafnium oxide, magnesium oxide (MgO), and zirconium oxide.

A refractive index of the second solid immersion lens portion 500 may be smaller than that of the first solid immersion lens portion 400. Since the refractive index of the second solid immersion lens portion 500 is smaller than that of the first solid immersion lens portion 400, a light emission direction of the single photon can be directed in the height direction of the single photon source device 1 without hardly changing the optical mode in the first solid immersion lens portion 400. Further, an operating bandwidth of the single emitter 300 may be widened. The refractive index of the second solid immersion lens portion 500 may be 1.2 to 2.5. When the refractive index of the second solid immersion lens portion 500 is smaller than 1.2, vertical orientation adjustment may be difficult. Further, when the refractive index of the second solid immersion lens portion 500 is greater than 2.5, a non-negligible resonance effect occurs in the second solid immersion lens portion 500, making it difficult to secure better vertical directionality.

The second solid immersion lens portion 500 may be formed by coating, exposing, developing, and reflowing a photoresist. In the reflowing, heat may be applied to the photoresist remaining after development for fluidity, so that the photoresist remaining after development becomes the second solid immersion lens portion 500. A center of a cross section of the second solid immersion lens portion 500 on the insulating layer 200 may pass through a center of a cross section of the first solid immersion lens portion 400 on the insulating layer 200, and be located within 500 nm in a radial direction perpendicular to the virtual line VL extending in the height direction of the single photon source device 1 from the virtual line VL. Therefore, some of the single photons emitted from the single emitter 300 located within the first solid immersion lens portion 400 and the single photons emitted from the single emitter 300 and reflected by the reflection layer 100 may pass through the first solid immersion lens portion 400 and travel to the second solid immersion lens portion 500. When the center of the cross section of the second solid immersion lens portion 500 on the insulating layer 200 is located outside 500 nm in the radial direction perpendicular to the above-described virtual line VL from the virtual line VL, the emission efficiency can decrease.

Figure 5:
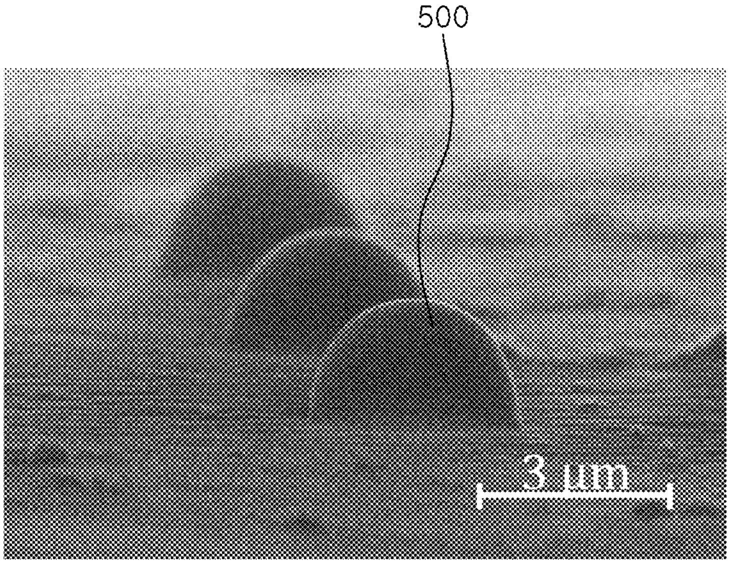
FIG. 5 shows a photograph obtained by photographing the second solid immersion lens portion of the single photon source device according to the first embodiment of the present disclosure using the scanning electron microscope.

Referring to FIGS. 2 and 5, the second solid immersion lens portion 500 on the insulating layer 200 may have a diameter D2 of about 1 μm to 10 μm, and a thickness of about 1 μm to 10 μm. When the diameter D2 of the second solid immersion lens portion 500 on the insulating layer 200 is smaller than 1 μm or larger than 10 μm, the emission efficiency may decrease. Further, when a height of the second solid immersion lens portion 500 on the insulating layer 200 is smaller than 1 μm and greater than 10 μm, the emission efficiency may decrease.

Figure 6:
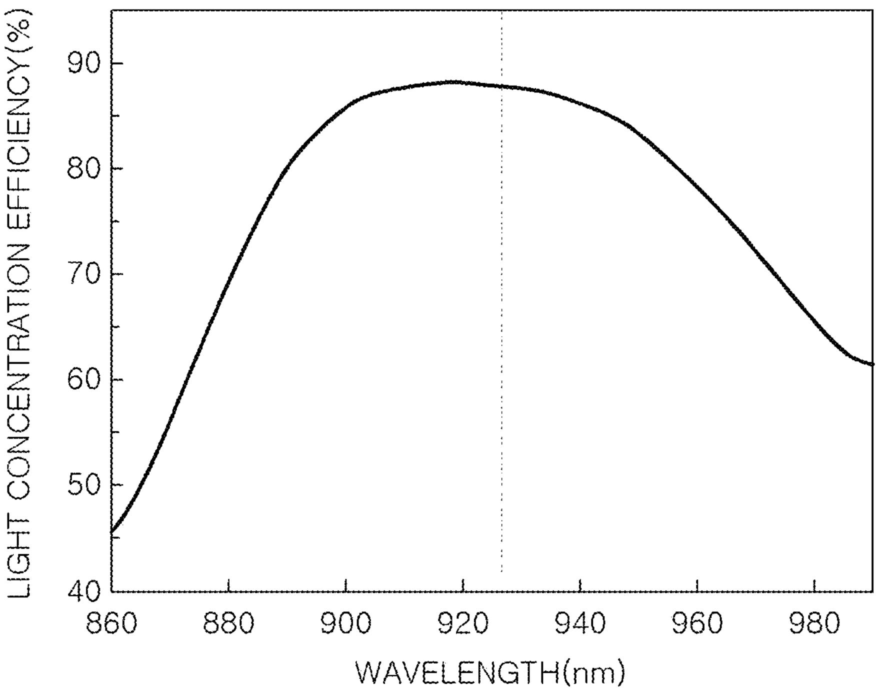
FIG. 6 is a graph showing change in light collection efficiency according to a wavelength of a single photon emitted from the single photon source device according to the first embodiment of the present disclosure, which is obtained through a simulation.
Figure 7:
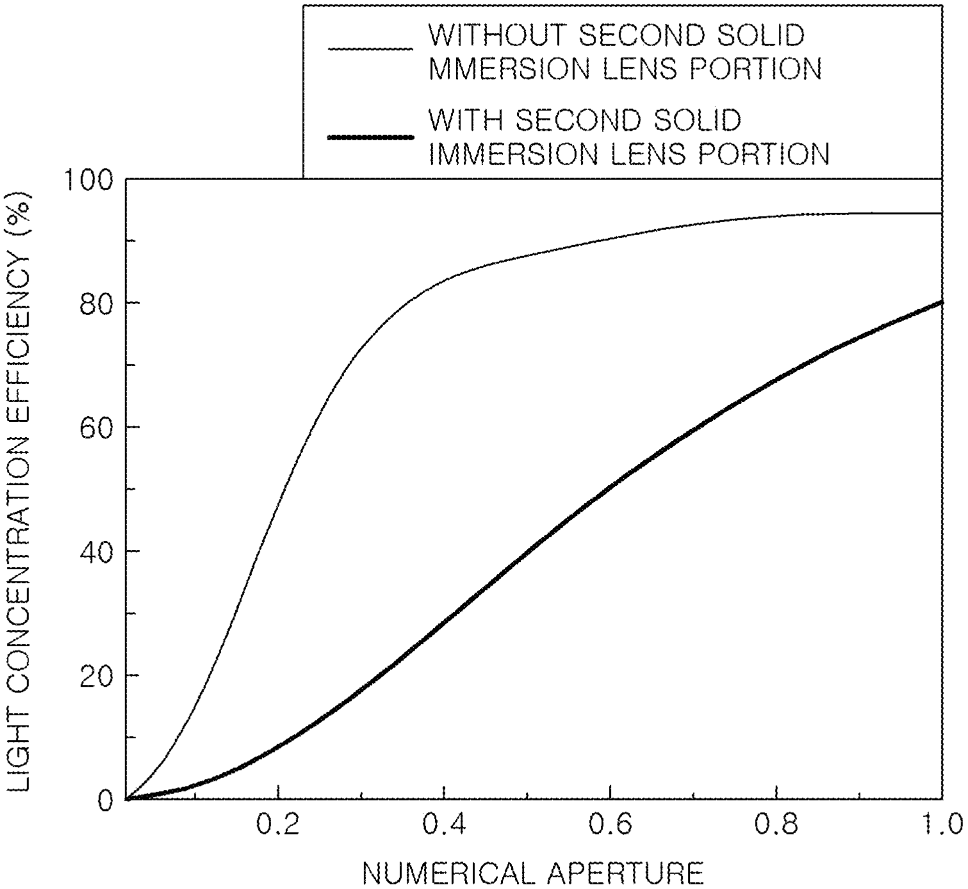
FIG. 7 is a graph showing light collection efficiency of the single photon source device that does not include the second solid immersion lens portion and light collection efficiency according to a numerical aperture (NA) of the single photon source device that includes the second solid immersion lens portion.

It can be seen from FIG. 6 that the single photon source device 1 having the above-described configuration concentrates 80% or more of single photons in a wavelength range of 890 nm to 960 nm. In other words, it can be seen that 80% or more of the photons are collected at a bandwidth of about 70 nm. Therefore, the single photon source device 1 can simultaneously satisfy a wide operating band and high light collection efficiency. Further, it can be seen from FIG. 7 that, when the single photon source device 1 includes the second solid immersion lens portion 500, the light collection efficiency is improved.

With this single photon source device 1, it is possible to generate single photons with high indistinguishability. When a laser having an emission wavelength matched with that of the single emitter 300 is used to excite the single photon source device 1, it is possible to generate single photons with high indistinguishability. In other words, resonant excitation can be used to obtain the single photons with high indistinguishability from the single photon source device 1. Further, it is possible to generate single photons with high indistinguishability even when a laser having a wavelength close to the emission wavelength of the single emitter 300 is used to excite the single photon source device 1. In other words, quasi-resonant excitation can be used to obtain the single photons with high indistinguishability from the single photon source device 1. Examples of the quasi-resonant excitation may include p-shell pumping or phonon-assisted pumping.

Meanwhile, according to a second embodiment of the present disclosure, the single photon source device 1 may further include a substrate 600 and a piezoelectric substrate 700, in addition to this configuration.

Hereinafter, the second embodiment will be described with reference to FIGS. 8 and 9. The second embodiment of the present disclosure is different from the first embodiment described above, is that the single photon source device 1 further includes the substrate 600 and the piezoelectric substrate 700, this difference will be mainly described, and the same description and reference numerals as those in the above-described embodiments will be used.

Figure 8:
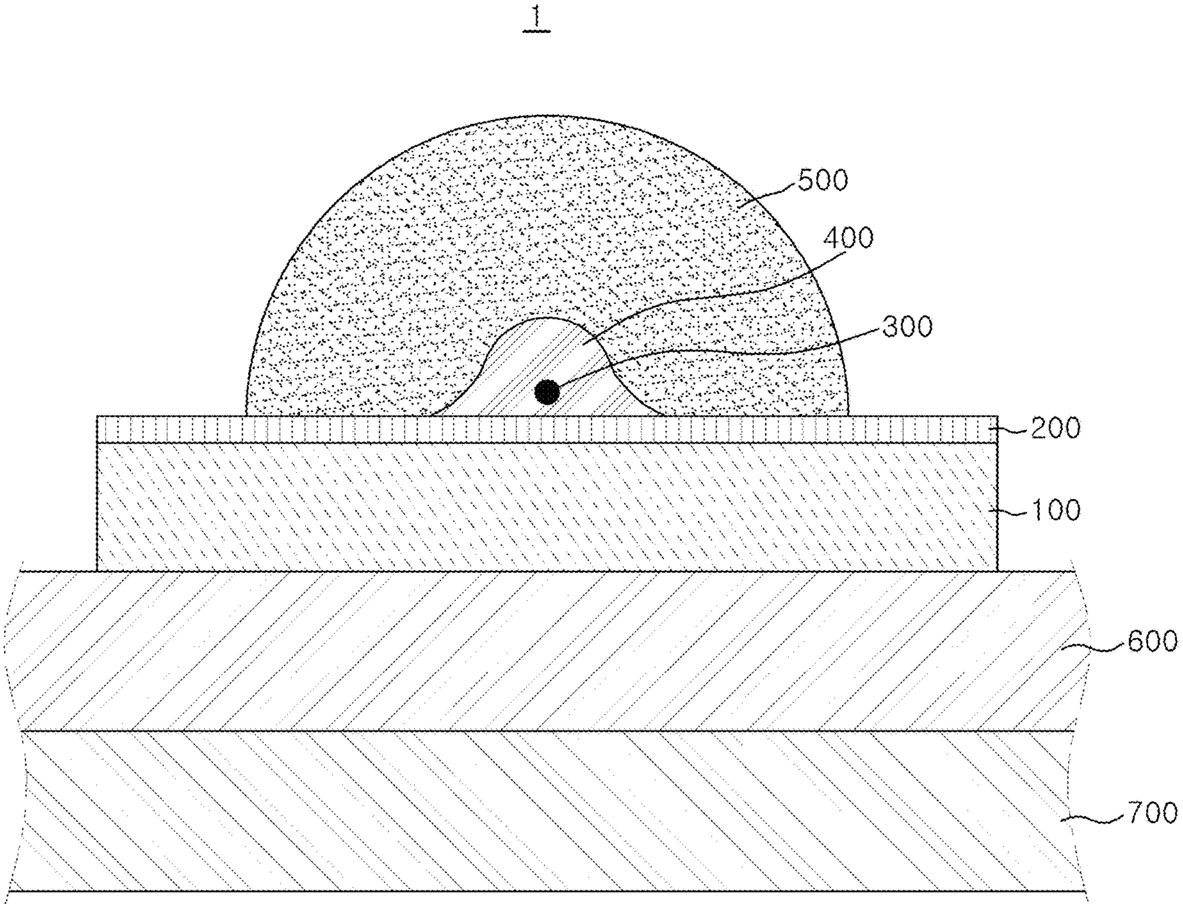
FIG. 8 is a cross-sectional view of a single photon source device according to a second embodiment of the present disclosure.

Referring to FIG. 8, according to the second embodiment of the present disclosure, the single photon source device 1 may further include the substrate 600 and the piezoelectric substrate 700.

The substrate 600 may support the reflection layer 100. The substrate 600 may include one or more of silicon (Si), gallium arsenide (GaAs), indium phosphide (InP), aluminum arsenide (AlAs), silicon oxide ($SiO_2$), aluminum oxide ($Al_2O_3$), and silicon nitride (SiN). The substrate 600 may be bonded directly to the reflection layer 100 to support the reflection layer 100, or may be bonded to the reflection layer 100 using an adhesive containing epoxy to support the reflection layer 100.

The substrate 600 may be disposed on the piezoelectric substrate 700. The piezoelectric substrate 700 may include one or more of a lead zirconate titanate (PZT) series and a lead magnesium niobate-lead titanate (PMN-PT) series. The piezoelectric substrate 700 may be connected to a power supply. Further, when a voltage is applied to the piezoelectric substrate 700 by the power supply, strain may occur in the piezoelectric substrate 700. Further, a wavelength of the single photons emitted from the single emitter 300 may be changed through transfer of the strain occurring in the piezoelectric substrate 700.

Figure 9:
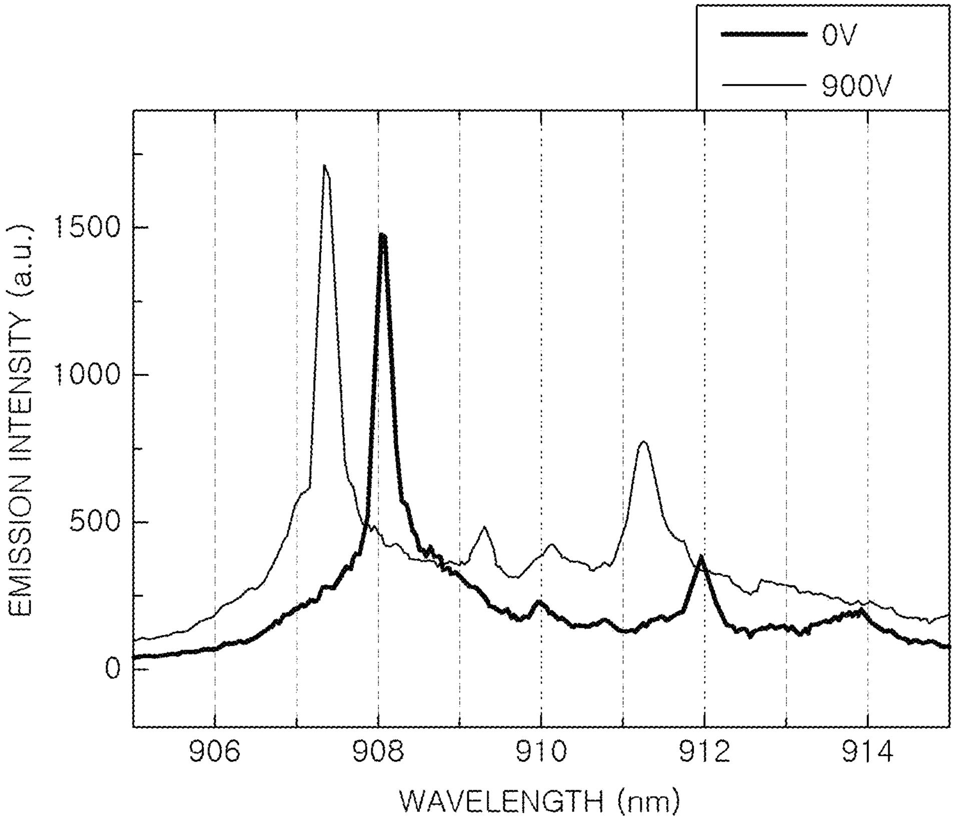
FIG. 9 is a graph showing that a wavelength of a single photon is changed by the single photon source device according to the second embodiment of the present disclosure.

It can be seen from FIG. 9 that, when a voltage of 900 V is applied to the piezoelectric substrate 700, the wavelength of the single photons emitted from the single emitter 300 is changed.

Further, when the voltage is applied to the piezoelectric substrate 700 by the power supply, strain occurs in the piezoelectric substrate 700, and a fine structure splitting can be adjusted to a minimum through transfer of the strain so that entangled photon pairs can be generated.

Meanwhile, the reflection layer 100 may be disposed on the piezoelectric substrate 700 without the substrate 600.

Method of Manufacturing Single Photon Source Device

Hereinafter, a specific configuration of a method of manufacturing the single photon source device according to an embodiment of the present disclosure will be described with reference to FIGS. 10 to 14.

Figure 10:
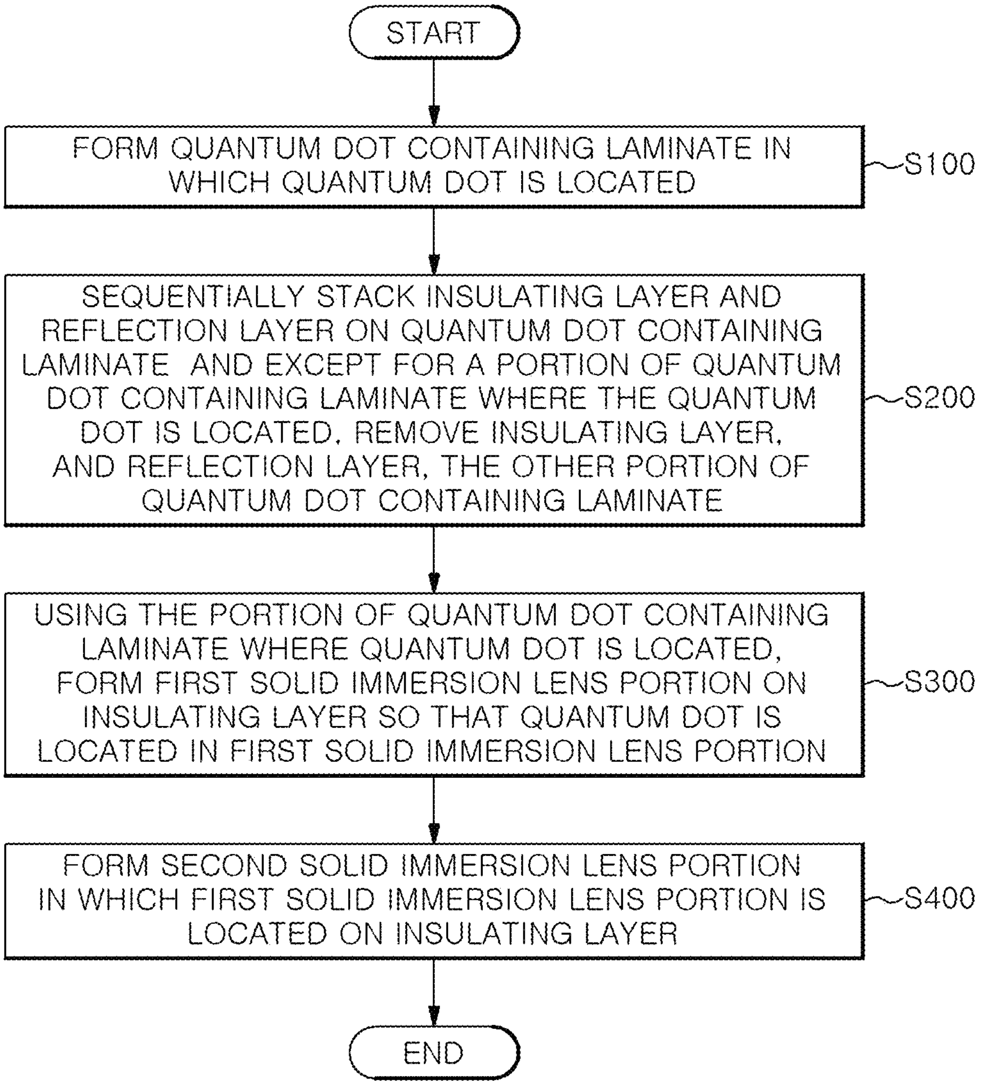
FIG. 10 is a diagram illustrating a method of manufacturing a single photon source device according to an embodiment of the present disclosure.

With the method of manufacturing single photon source device according to an embodiment of the present disclosure, the single photon source device 1 in which the single emitter 300 is a quantum dot can be manufactured. In the method of manufacturing single photon source device, it is not easy to use an electron beam lithography, a dry etching equipment, or the like, and the single photon source device 1 can be manufactured without using expensive devices. In addition, with the method of manufacturing single photon source device, it is possible to easily manufacture the single photon source device 1 with a good yield and low fabricating cost. Referring to FIG. 10, the method of manufacturing single photon source device may include forming a quantum dot containing epitaxial layer (S100), processing the quantum dot containing epitaxial layer (S200), forming a first solid immersion lens portion (S300), and forming a second solid immersion lens portion (S400).

Figure 11:
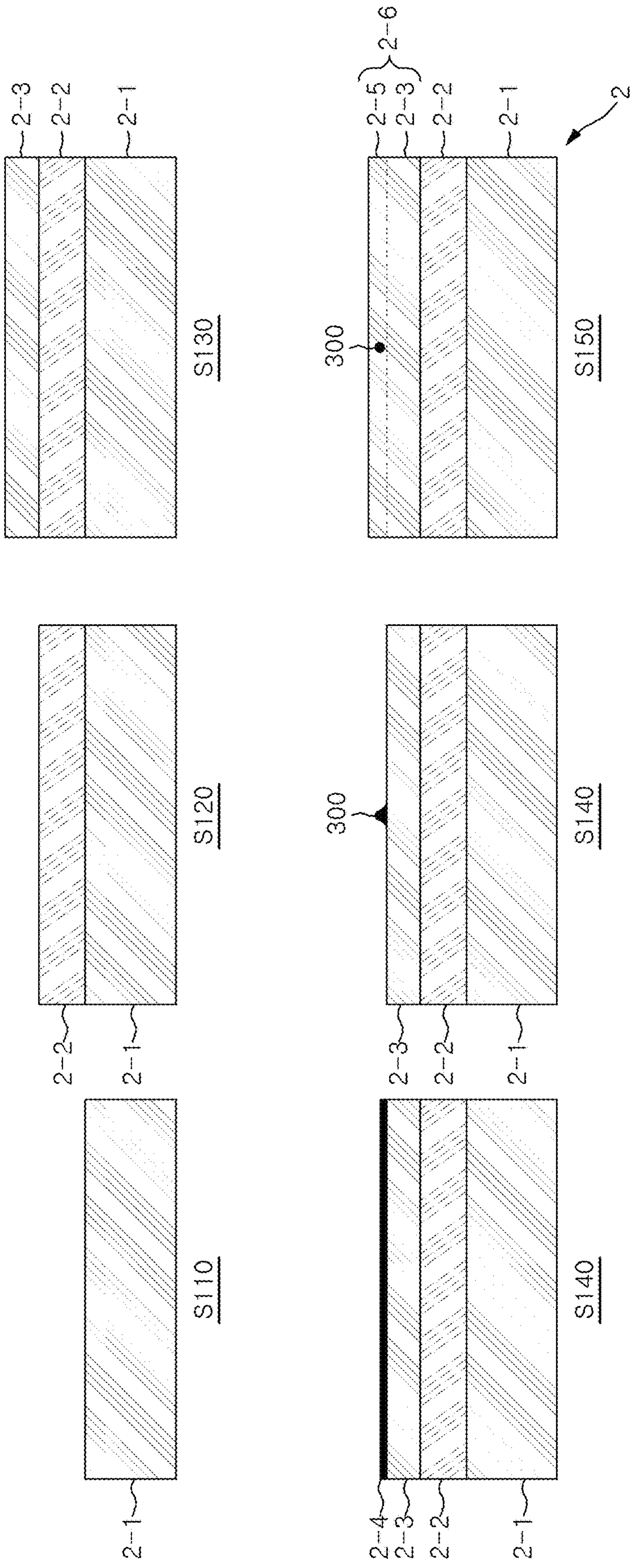
FIG. 11 is a process diagram illustrating a step of forming epitaxial layer including a quantum dot in the method of manufacturing single photon source device according to the embodiment of the present disclosure.

In the forming the quantum dot containing epitaxial layer (S100), a epitaxial layer 2 with quantum dot located therein as the single emitter 300 may be formed. Referring to FIG. 11, the forming the quantum dot containing epitaxial layer (S100) may include a first epitaxial layer layer preparation step (S110), a second epitaxial layer layer stacking step (S120), a third epitaxial layer stacking step (S130), a quantum dot forming layer stacking step (S140), and a quantum dot application step (S150).

In the first epitaxial layer preparation step (S110), a first epitaxial layer 2-1 may be prepared. The first epitaxial layer 2-1 may be a substrate. Further, the first epitaxial layer 2-1 may include one or more of gallium arsenide, indium gallium arsenide, gallium indium phosphide, aluminum gallium arsenide, aluminum arsenide, and indium phosphide. In other words, the first layer 2-1 may be a substrate containing one or more of gallium arsenide, indium arsenide, indium gallium arsenide, aluminum arsenide, and indium phosphide.

In the second epitaxial layer stacking step (S120), a second epitaxial layer 2-2 may be stacked on the first epitaxial layer 2-1. The second epitaxial layer 2-2 may include one or more of aluminum arsenide, aluminum gallium arsenide, gallium arsenide, aluminum indium gallium arsenide (AlINGaAs), indium gallium arsenide, indium gallium phosphide (InGaP), and indium gallium arsenide phosphide. The second epitaxial layer 2-2 may be stacked on the first epitaxial layer 2-1 by molecular-beam epitaxy or metal organic chemical vapor deposition.

In the third epitaxial layer stacking step (S130), the third epitaxial layer 2-3 may be stacked on the second epitaxial layer 2-2. The third epitaxial layer 2-2 may include one or more of gallium arsenide, indium arsenide, indium gallium arsenide, aluminum arsenide, indium gallium arsenide phosphide, aluminum indium gallium arsenide, and indium phosphide. The third epitaxial layer 2-3 may be stacked on the second epitaxial layer 2-2 by molecular beam crystal growth or organic metal chemical vapor deposition.

In the quantum dot forming layer stacking step (S140), a quantum dot forming layer 2-4 may be stacked on the third epitaxial layer 2-3. The quantum dot forming layer 2-4 may include one or more of indium arsenide, indium gallium arsenide, gallium arsenide, indium gallium arsenide phosphide, and indium phosphide. The quantum dot forming layer 2-4 may be stacked on the third epitaxial layer 2-3 by molecular beam crystal growth or organic metal chemical vapor deposition. The quantum dot may be formed as the single emitter 300 on the third epitaxial layer 2-3 by stacking the quantum dot forming layer 2-4 on the third epitaxial layer 2-3.

In the quantum dot application step (S150), a quantum dot application layer 2-5 is stacked on the third epitaxial layer 2-3 so that the quantum dot, which is single emitters 300, is applied by the quantum dot application layer 2-5. The quantum dot application layer 2-5 may include one or more of gallium arsenide, indium arsenide, indium gallium arsenide, aluminum arsenide, indium gallium arsenide phosphide, and indium phosphide. The quantum dot application layer 2-5 may be stacked on the third epitaxial layer 2-3 by molecular beam crystal growth or organic metal chemical vapor deposition. The quantum dot, which is the single emitter 300, can be protected from the outside by the quantum dot application layer 2-5. Further, the third epitaxial layer 2-3 and the quantum dot application layer 2-5 may be combined to form a quantum dot layer 2-6 in which the quantum dot that is the single emitter 300 is located. In addition, a distance L between the quantum dot, which is the single emitter 300, and the insulating layer 200 can be adjusted through adjustment of a thickness of the quantum dot application layer 2-5.

Figure 12:
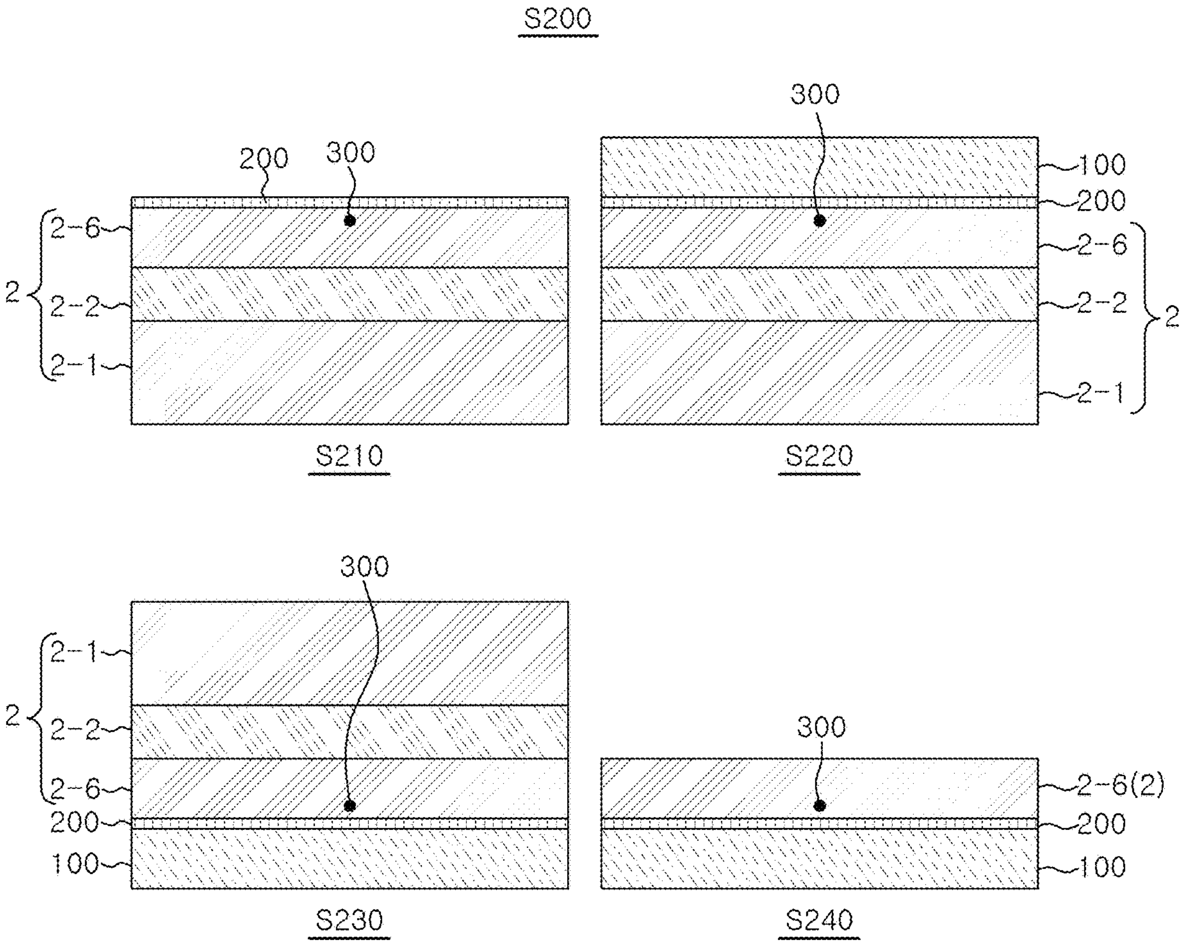
FIG. 12 is a process chart showing a step of processing the quantum dot containing epitaxial layer in the method of manufacturing single photon source device according to the embodiment of the present disclosure.

Referring to FIG. 12, in the processing the quantum dot containing epitaxial layer (S200), the insulating layer 200 and the reflection layer 100 may be sequentially stacked on the epitaxial layer 2 including quantum dot. Further, a portion of the epitaxial layer 2 where the quantum dot, which is the single emitter 300, is located, the insulating layer 200, and portions of the epitaxial layer 2 other than the reflection layer 100 may be removed. The processing the quantum dot containing epitaxial layer (S200) may include an insulating layer stacking step (S210), a reflection layer stacking step (S220), a flipping step (S230), and a layer removal step (S240).

In the insulating layer stacking step (S210), the insulating layer 200 may be stacked on the quantum dot layer 2-6 of the epitaxial layer 2. The insulating layer 200 may include one or more of silicon nitride, silicon oxide, aluminum oxide, aluminum nitride, titanium oxide, hafnium oxide, and zirconium oxide. The insulating layer 200 may be stacked on the quantum dot layers 2-6 of the epitaxial layer 2 by sputtering, electron beam deposition, or plasma enhanced chemical vapor deposition (PECVD).

In the reflection layer stacking step (S220), the reflection layer 100 may be stacked on the insulating layer 200. The reflection layer 100 may include one or more of gold, silver, aluminum, copper, and a distributed Bragg reflector. For example, the reflection layer 100 containing gold may be stacked on the insulating layer 200 by sputtering or electron beam deposition.

In the flipping step (S230), the epitaxial layer 2 can be flipped over so that the reflection layer 100 is located at a bottom. In the flipping step (S230), an upper surface of the epitaxial layer 2 may be bonded to the substrate and flipped.

In a layer removal step (S222), the first epitaxial layer 2-1 and the second epitaxial layer 2-2 of the epitaxial layer 2 may be removed. In the layer removal step (S222), the first epitaxial layer 2-1 and the second epitaxial layer 2-2 of the epitaxial layer 2 can be removed by mechanical etching or chemical etching. When the first epitaxial layer 2-1 and the second epitaxial layer 2-2 of the epitaxial layer 2 are removed in the layer removal step (S220), only the quantum dot layer 2-6 in which the quantum dot, which is the single emitter 300, is located may remain in the epitaxial layer 2.

Figure 13:
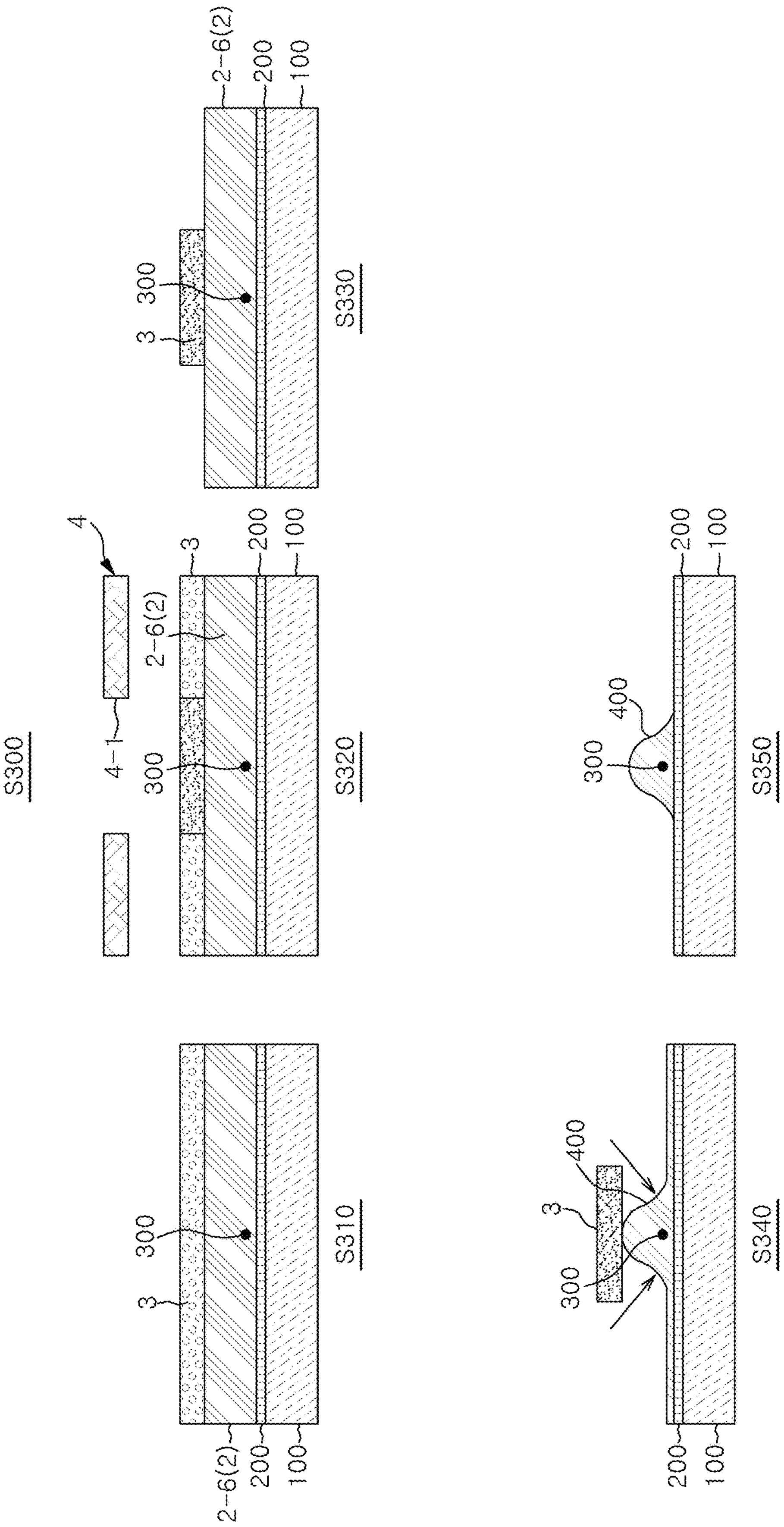
FIG. 13 is a process diagram illustrating a step of forming a first solid immersion lens portion in the method of manufacturing single photon source device according to the embodiment of the present disclosure.

Referring to FIG. 13, in the first solid immersion lens forming step (S300), the portion of the epitaxial layer 2 where the quantum dot, which is the single emitter 300, is located is used to form, on the insulating layer 200, the first solid immersion lens portion 400 surrounding the quantum dot, which is the single emitter 300. In other words, in the first solid immersion lens forming step (S300), the first solid immersion lens portion 400 surrounding the quantum dot which is the single emitter 300 may be formed on the insulating layer 200 using the quantum dot layer 2-6 of the epitaxial layer 2, in which the quantum dot which is the single emitter 300 is located. The first solid immersion lens forming step S300 includes a first photoresist coating step S310, a first exposure step S320, a first developing step S330, an etching step S340, and a first photoresist removal step S350.

In the first photoresist coating step (S310), the first photoresist 3 may be coated on the quantum dot layer 2-6 of the epitaxial layer 2. The first photoresist 3 may be a negative photoresist. The negative photoresist may be AZ5214, S1818, or SU-8, but other negative photoresists may also be used.

In the first exposure step S320, laser exposure may be performed on the first photoresist 3 using the first photo mask 4 on which the first pattern 4-1 is formed. For example, when the first photoresist 3 is a negative photoresist, laser exposure may be performed on a portion of the first photoresist 3 above a portion of the quantum dot layer 2-6 that becomes the first solid immersion lens portion 400, by using the first photo mask 4. In this case, the position of the quantum dot which is the single emitter 300 in the first solid immersion lens portion 400 can be accurately found using the laser, and this position can be utilized for disposition of the first photo mask 4, laser exposure, or the like. In other words, when the quantum dot which is the single emitter 300 is irradiated with a laser, the position of the quantum dot, which is a single emitter 300, can be accurately found by using the emission of the single photons from the quantum dot. Further, the first photo mask 4 may be disposed so that the quantum dot, which is the single emitter 300, is located at an exact center of the first pattern 4-1 of the first photo mask 4. In this state, laser exposure of the first photoresist 3 can be performed.

Meanwhile, in the first exposure step (S320), laser exposure can be performed on the first photoresist 3 using a focusing laser without using the first photo mask 4. In this case, the laser itself can serve as a circular mask. For example, when the first photoresist 3 is a negative photoresist, the laser exposure can be performed by placing a laser spot on the portion of the first photoresist 3 above the portion of the quantum dot layer 2-6 that will become the first solid immersion lens portion 400 and irradiating a strong laser thereto. In this case, the position of the quantum dot which is the single emitter 300 in the first solid immersion lens portion 400 can be accurately found using the laser, and this position can be utilized for laser exposure, or the like. In other words, when the quantum dot which is the single emitter 300 is irradiated with a laser, the position of the quantum dot can be accurately found by using the emission of the single photons from the quantum dot. Further, the laser can be located so that the quantum dot is located at an exact center of the laser spot. In this state, laser exposure of the first photoresist 3 can be performed.

In the first development step (S330), a portion of the first photoresist 3 other than the portion of the first photoresist 3 on the portion of the quantum dot layer 2-6, which will become the first solid immersion lens portion 400, may be removed using a developer. Representative developers include an AZ 300 MIF developer, an AZ 500 MIF developer, a SU-8 developer, and an MF-319 developer sold by photoresist development companies, and other developers may also be available. In the etching step (S340), the quantum dot layer 2-6 under the remaining first photoresist 3 is etched so that the first solid immersion lens portion 400 can be formed. In the etching step (S340), the quantum dot layer 2-6 under the first photoresist 3 is etched by wet etching so that the first solid immersion lens portion 400 can be formed. In the wet etching, a mixed solution of hydrochloric acid (HCl) and hydrogen peroxide (H2O2), a mixed solution of sulfuric acid (H2SO4) and hydrogen peroxide, or a mixed solution of phosphoric acid (H3PO4), nitric acid (HNO3), citric acid (C6H8O7) and hydrogen peroxide may be available.

In the first photoresist removal step (S350), the remaining first photoresist 3 may be removed. In the first photoresist removal step (S350), the remaining first photoresist 3 may be removed by using a material capable of removing organic solvents, such as acetone.

Figure 14:
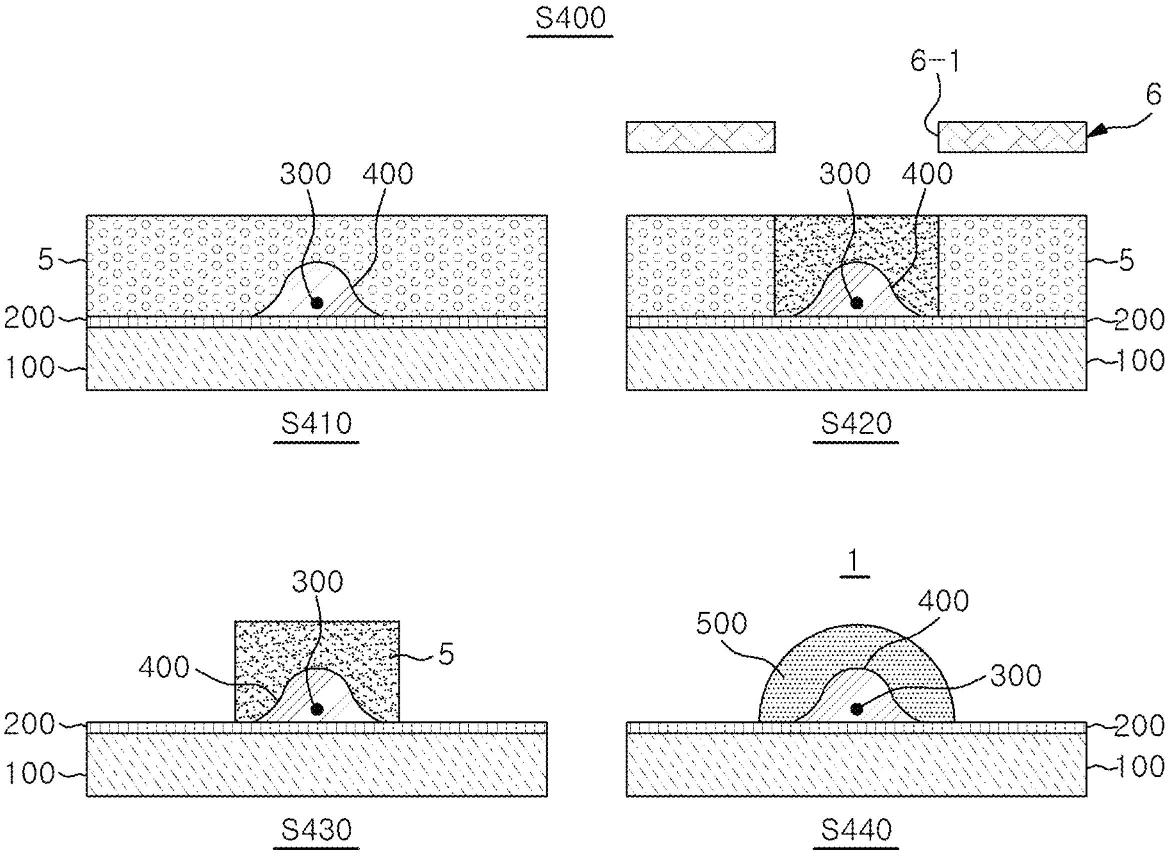
FIG. 14 is a process diagram illustrating a step of forming a second solid immersion lens portion in the method of manufacturing single photon source device according to the embodiment of the present disclosure.

Referring to FIG. 14, in the forming the second solid immersion lens portion (S400), the second solid immersion lens portion 500 surrounding the first solid immersion lens portion 400 may be formed on the insulating layer 200. The forming the second solid immersion lens (S400) may include a second photoresist coating step (S410), a second exposure step (S420), a second developing step (S430), and a reflow step (S440).

In the second photoresist coating step (S410), the second photoresist 5 may be coated on the insulating layer 200 to cover the first solid immersion lens portion 400. The second photoresist 5 may be a negative photoresist.

In the second exposure step (S420), laser exposure may be performed on the second photoresist 5 using a second photo mask 6 on which a second pattern 6-1 is formed. For example, when the second photoresist 5 is the negative photoresist, laser exposure is performed on a portion of the second photoresist 5 that becomes the second solid immersion lens portion 500 by using the second photo mask 6. In this case, the position of the quantum dot which is the single emitter 300 in the first solid immersion lens portion 400 can be accurately found using the laser, and this position can be utilized for disposition of the second photo mask 6, laser exposure, or the like. In other words, when the quantum dot which is the single emitter 300 is irradiated with a laser, the position of the quantum dot, which is a single emitter 300, can be accurately found by using the emission of the single photons from the quantum dot. Further, the second photo mask 6 may be disposed so that the quantum dot is located at an exact center of the second pattern 6-1 of the second photo mask 6. In this way, laser exposure of the second photoresist 5 may be performed. In this process, the center of the cross section of the second solid immersion lens portion 500 on the insulating layer 200 can be matched with the center of the cross section of the first solid immersion lens portion 400 on the insulating layer 200.

Meanwhile, in the second exposure step (S420), the laser exposure may be performed on the second photoresist 5 using a focusing laser without using the second photo mask 6. In this case, the laser itself can serve as a circular mask. For example, when the second photoresist 5 is the negative photoresist, the laser exposure may be performed on the laser spot of the second photoresist 5 that becomes the second solid immersion lens portion 500. In this case, the position of the quantum dot which is the single emitter 300 in the first solid immersion lens portion 400 can be accurately found using the laser, and this position can be utilized for disposition of the second photo mask 6, laser exposure, or the like. In other words, when the quantum dot which is the single emitter 300 is irradiated with a laser, the position of the quantum dot can be accurately found by using the emission of the single photons from the quantum dot. Further, the laser can be located so that the quantum dot, which is the single emitter 300, is located at the exact center of the laser spot. In this state, laser exposure of the second photoresist 5 can be performed.

In the second development step (S430), a portion of the second photoresist 5 other than the portion of the second photoresist 5 that will become the second solid immersion lens portion 500 may be removed by using a developer. Representative developers available for photoresist may include an AZ 300 MIF developer, an AZ 500 MIF developer, a SU-8 developer, and an MF-319 developer sold by photoresist development companies, and other developers may also be available.

In the reflow step (S440), heat is applied to the remaining second photoresist 5 for fluidity so that the remaining second photoresist 5 becomes the second solid immersion lens portion 500.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. A single photon source device comprising:

a reflection layer;

an insulating layer disposed on the reflection layer;

a single emitter configured to emit a single photon;

a first solid immersion lens portion disposed on the insulating layer to surround the single emitter; and a second solid immersion lens portion disposed on the insulating layer to surround the first solid immersion lens portion.

2. The single photon source device of claim 1, wherein the first solid immersion lens portion has a convex shape protruding from the insulating layer, and wherein the second solid immersion lens portion has a convex shape protruding from the insulating layer.

3. The single photon source device of claim 2, wherein the single emitter is spaced apart from the insulating layer in a height direction of the single photon source device.

4. The single photon source device of claim 3, wherein the single emitter is located within 200 nm from a virtual line in a radial direction perpendicular to the virtual line, the virtual line passing through a center of a cross section of the first solid immersion lens portion on the insulating layer and extending in the height direction of the single photon source device.

5. The single photon source device of claim 4, wherein a distance between the single emitter and the insulating layer is a distance corresponding to an antinode of a distribution of the single photon emitted from the single emitter.

6. The single photon source device of claim 5, wherein a center of a cross section of the second solid immersion lens portion on the insulating layer is located within 500 nm in the radial direction perpendicular to the virtual line from the virtual line.

7. The single photon source device of claim 1, wherein the first solid immersion lens portion includes a semiconductor.

8. The single photon source device of claim 7, wherein the first solid immersion lens portion includes one or more of gallium arsenide (GaAs), aluminum gallium arsenide (AlGaAs), gallium indium phosphide (GaInP), indium gallium arsenide (InGaAs), aluminum indium gallium arsenide (AlInGaAs), indium phosphide (InP), or indium gallium arsenide phosphide (InGaAsP).

9. The single photon source device of claim 1, wherein the second solid immersion lens portion includes one or more of a polymer or a dielectric, wherein the polymer included in the second solid immersion lens portion is a photoresist or an electron beam resist, and wherein the dielectric included in the second solid immersion lens portion includes one or more of silicon nitride (SiN), silicon oxide ($SiO_2$), aluminum oxide ($Al_2O_3$), aluminum nitride (AlN), titanium oxide ($TiO_2$), hafnium oxide ($HfO_2$), magnesium oxide (MgO), or zirconium oxide (ZnO).

10. The single photon source device of claim 1, wherein a refractive index of the second solid immersion lens portion is smaller than a refractive index of the first solid immersion lens portion.

11. The single photon source device of claim 1, wherein the reflection layer includes one or more of gold (Au), silver (Ag), aluminum (Al), copper (Cu), or a distributed Bragg reflector (DBR).

12. The single photon source device of claim 1, wherein the insulating layer is transparent at an emission wavelength of the single emitter.

13. The single photon source device of claim 1, wherein the insulating layer includes one or more of silicon nitride (SiN), silicon oxide ($SiO_2$), aluminum oxide ($Al_2O_3$), aluminum nitride (AlN), titanium oxide ($TiO_2$), hafnium oxide ($HfO_2$), magnesium oxide (MgO), or zirconium oxide (ZnO).

14. The single photon source device of claim 1, wherein the single emitter is a quantum dot.

15. The single photon source device of claim 14, wherein the quantum dot includes a semiconductor, and wherein the quantum dot includes one or more of indium arsenide (InAs), indium gallium arsenide (InGaAs), aluminum gallium arsenide (AlGaAs), gallium arsenide (GaAs), or indium phosphide (InP).

16. The single photon source device of claim 1, wherein the single emitter includes one or more of a solid point defect or a single molecule.

17. The single photon source device of claim 16, wherein the solid point defect includes any one of a nitrogen-vacancy center or a silicon-vacancy center.

18. The single photon source device of claim 1, wherein the first solid immersion lens portion on the insulating layer has a diameter of 400 nm to 2000 nm, and a height of 200 nm to 2000 nm, and wherein the second solid immersion lens portion on the insulating layer has a diameter of 1 μm to 10 μm and a height of 1 μm to 10 μm.

19. The single photon source device of claim 1, further comprising:

a piezoelectric substrate disposed under the reflection layer.

20. A method of manufacturing a single photon source device, comprising:

forming a quantum dot containing epitaxial layer in which a quantum dot is located;

processing the quantum dot containing epitaxial layer in which an insulating layer and a reflection layer are sequentially stacked on the quantum dot containing epitaxial layer, wherein except for a portion of the quantum dot containing epitaxial layer where the quantum dot is located, the insulating layer, and the reflection layer, the other portion of the quantum dot containing epitaxial layer are removed;

forming a first solid immersion lens portion surrounding the quantum dot on the insulating layer using the portion of the quantum dot containing epitaxial layer where the quantum dot is located; and forming a second solid immersion lens portion surrounding the first solid immersion lens portion on the insulating layer.

* * * * *